United States Patent Office 3,340,428
Patented Sept. 5, 1967

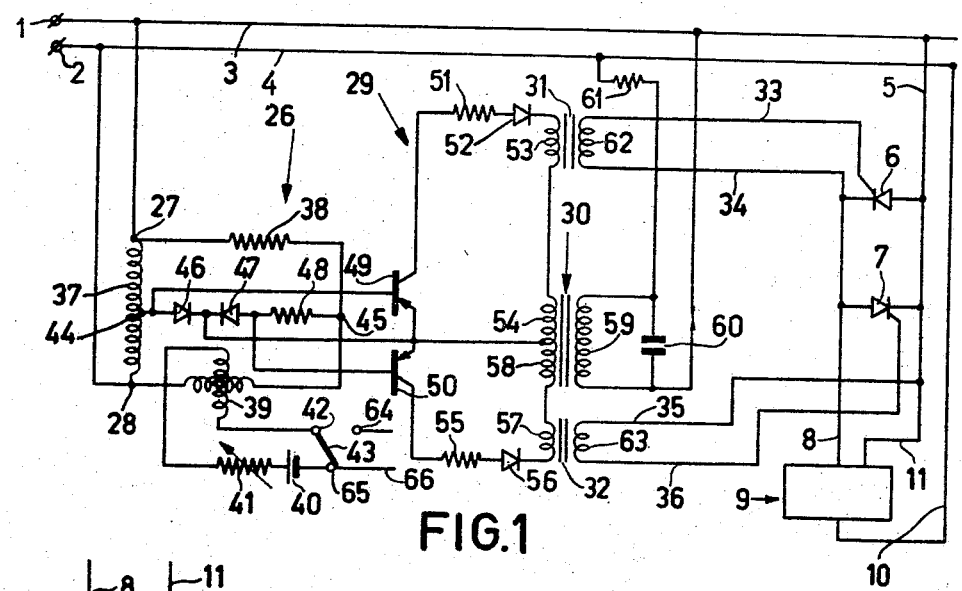

3,340,428
CIRCUIT FOR ACCURATELY CONTROLLING THE CONDUCTION PERIODS OF CONTROLLED RECTIFIERS CONNECTED IN INVERSE PARALLEL
Jozef Cornelis Moerkens and Dan Bernardus Wajsbaum, Emmasingel, Eindhoven, Netherlands, assignors to North American Philips Company, Inc., New York, N.Y., a corporation of Delaware
Filed Mar. 11, 1965, Ser. No. 438,933
Claims priority, application Netherlands, Mar. 12, 1964, 64—2,537
8 Claims. (Cl. 315—194)

The invention relates to a control system for energizing an electric load, more particularly an electric discharge tube, with alternating current which is supplied to the load through controlled reversely connected rectifiers.

A controlled rectifier is to be understood to mean herein an electric element in which in dependence upon a voltage at a control electrode a current is passed in one direction between two main electrodes. A voltage at a control electrode is referred to as a control voltage.

It is known to provide the controlled rectifiers of such an arrangement with a control voltage of the same frequency as the voltage supplied to the main electrode circuit. It is also known to render the phase of the control voltage variable.

Such an arrangement is used, for example, for energizing electric discharge lamps. The power absorption of these lamps may then be varied. The reduction of the power absorption of the lamps is referred to as dimming. It is also possible to feed other electric consuming devices with the aid of such an arrangement in which the power absorption is also variable.

It is known that differences between controlled rectifiers with respect to the properties determining their becoming conductive sometimes give rise to disadvantageous effects. This is the case, for example, when one of the two reversely connected controlled rectifiers differs from the other with respect to the properties determining their becoming conductive. The power absorbed by the load during one half of the cycle then differs from the power absorbed during the subsequent half of the cycle. This is disadvantageous.

Especially in the case where two or more of the said arrangements should co-operate, a difference between the rectifiers associated with one arrangement and those associated with one of the other arrangements with respect to the properties determining their becoming conductive may be disturbing, and may sometimes even have dangerous consequences. The following should be noted for further explanation. When the load consists of a great plurality of discharge lamps for illuminating a large space, in many cases it will be necessary to subdivide the load into groups in view of the maximum permissible currents which can be processed by a given controlled rectifier. Each group is then fed by an individual arrangement. When the relative adjustment of these groups is not quite correct as a result of a difference between the controlled rectifiers with respect to the properties determining their becoming conductive, this implies that in a given situation one of the groups is dimmed more strongly than another group. When such a situation occurs in a cinema hall, the result is an uneven illumination which is very disturbing. However, when the relevant space is, for example, a car tunnel, such situations may give rise to serious traffic problems. For example, when a car drives at high speed from a weakly dimmed section of the tunnel into a strongly dimmed section, the state of adaptation of the driver will not always match sufficiently the level in the last-mentioned section.

It is known to eliminate differences between controlled rectifiers with respect to the properties determining their becoming conductive by the use of control voltages having steep leading edges.

But even when use is made of a control voltage having a steep leading edge, an undesirable situation may exist in which sections are strongly dimmed and other sections are less strongly dimmed. This phenomenon is attributable to differences between the controlled rectifiers with respect to the properties determining their becoming non-conductive.

It is known per se that a controlled rectifier may become non-conductive under various conditions, namely, in the first place at the instant of the zero passage of the current through the main electrodes in case a suitable control voltage is available. Secondly, the rectifier becomes non-conductive if upon the decrease of the instantaneous current through (instantaneous voltage between) the main electrodes the so-called holding value is attained, that is to say if no suitable control voltage is available. This holding value may be a holding current or a holding voltage. For the sake of simplicity, reference will be mainly made hereinafter to a holding current. If the controlled rectifiers of lamp groups cooperating with each other have different holding current values and no suitable control signals are available, it is also possible that such non-uniformly illuminated sections are obtained. Especially in case of a small power absorption of the load, the differences in the illumination of the sections may be great.

It has already been suggested to connect a resistor in parallel with the load in order to increase the instantaneous current through the main electrodes of the controlled rectifiers. It is thus achived that also when the power absorption of the original load is small the amplitude of the current through the main electrodes is maintained at a value such that the holding current values are atttained only a comparatively short time before the zero passage of the load current. In this manner, a more uniform illumination of the sections is obtained. This solution suffers from a limination in that it involves additional losses of power while it is not yet sufficient for small power absorptions.

It is known per se to choose the control voltage at the control electrode of a controlled rectifier so that this voltage subsists for a time sufficiently long to eliminate differences, if any, in holding currents. In the case just mentioned, however, the control voltage does not have a steep leading edge. A satisfactory co-operation of a few of these arrangements then requires auxiliary devices which must be adjusted individually.

The invention has for its object to obviate, or at least to mitigate, the disadvantages of the known solutions in a simple manner.

According to the invention, use is made of an arrangement for feeding an electric load, more particularly an electric discharge tube, with alternating current which is supplied to the load through reversely connected controlled rectifiers. The phase angle at which the alternating current is switched on by the control voltages at the controlled rectifiers is made variable. The frequency of the control voltages is equal to that of the alternating voltage supplied to the main electrode circuit. The arrangement is characterized in that the control voltage of a controlled rectifier is produced with the aid of an alternating-voltage-supplied control amplifier, to the control electrode of which is supplied an alternating voltage which is shifted in phase, so that the output voltage of the control amplifier and hence the control voltage of the controlled rectifier has a steep leading edge and then exhibits a substantially sinusoidal variation with a zero passage at least later than the subsequent zero passage of the alternating voltage which is supplied to the main electrode circuit.

Consequently, in such a supply arrangement the control voltage at the control electrode of a controlled rectifier has a shape such that differences between the rectifiers with respect to the properties determining their becoming conductive and also with respect to the properties determining their becoming non-conductive may be limited. This also means that for the present use the said rectifiers are allowed to have wider tolerance ranges.

A supply arrangement according to the invention makes it possible to obtain a very satisfactory relative matching of the various sections, even in the dimmed position.

A relative phase shift of the alternating voltage in the main electrode circuit of the control amplifier and the alternating voltage supplied to the control electrode of the control amplifier makes it possible for the control amplifier to produce a voltage having a steep leading edge. This can be accomplished by causing the alternating voltage in the main circuit of the control amplifier to load with respect to the alternating voltage supplied to the control electrode of the control amplifier so that at the instant at which the voltage at this control electrode has reached a value such that it puts the control amplifier into operation, the instantaneous value of the voltage in the main circuit of the control amplifier has already attained a considerable value. This question will be discussed further hereinafter with reference to FIG. 3 of this description.

When the voltage of the control amplifier is also used for producing the remaining part of the control voltage, i.e. the so-called trailing edge of the control voltage, this part of the control voltage may have a substantially sinusoidal variation. Owing to a relative phase shift of the voltage in the main circuit of the control amplifier (or the voltage across an element of that main circuit) and the voltage supplied to the main electrode circuit of the controlled rectifier, the zero passage of this trailing edge may take place at another instant than that of the voltage supplied to this main electrode circuit.

The trailing edge of the control voltage should slightly lag in phase with respect to the alternating voltage supplied to the main electrode circuit of the controlled rectifier. For further explanation, first the case of an inductive load under full load conditions is considered. The term "full load" is to be understood to mean herein the power absorption of the load which occurs if the controlled rectifiers are operated at such control voltages that they are constantly conductive in their forward direction. As far as the load current is concerned, this corresponds with a situation in which the reversely connected rectifiers would be short-circuited. In the case of full load, the load current is termed $I_v$.

In order to achieve the full-load conditions solely with the aid of the control voltages, so, for example, without a short circuit of the rectifiers, the control voltages should subsist at least until the instant at which $I_v$ passes through zero. If a control voltage becomes zero at an earlier instant, the instantaneous value of the load current through the controlled rectifier in question may even exceed the holding current value of that rectifier. This implies that it is not the instant at which the control voltage ceases, but rather the value of the individual holding current that is decisive of the instant at which the rectifier becomes non-conductive.

The earlier the control voltage becomes zero, the greater is the possibility that the individual value of the holding current of the rectifier determines the instant at which the rectifier becomes non-conductive.

In the case of an inductive load, $I_v$ passes through zero at later instant than the voltage supplied to the main electrode circuit. Therefore, the instant at which the control signal ceases will be fixed later than the zero passage of the voltage supplied to the main electrode circuit in order to limit the influence of differences between the holding current values of the rectifiers.

As will be apparent hereinafter from FIG. 3, with a power absorption smaller than that in the case of full load, the said instant at which the control signal ends is then certainly satisfactory. This is not only of importance for inductive loads, but also for the inductive parts of a load. It should be noted in this connection that any capacitive parts of the load constitute in the first place a very low impedance of the load current upon the appearance of the control voltage.

In a favourable embodiment in accordance with the invention, the control amplifier is a transistor amplifier, one of the transistors of which is connected in series with the secondary of a transformer, while the circuit of this series-combination is coupled with an electrical connecting load between the control electrode and a main electrode, more particularly the cathode, of the controlled rectifier, a voltage being induced in this secondary winding which lags with respect to the alternating voltage supplied to the main electrode circuit of the controlled rectifier.

For, when this lag is already introduced into the voltage source of the amplifier portion, the use of additional impedances in the amplifier portion, which would consume part of the power available in this amplifier portion, is rendered superfluous.

A further improvement of the last-mentioned embodiment is obtained when the transistor connected with the transformer is rendered periodically conductive with the aid of a voltage supplied to this transistor through a variable phase shifting network, the phase of the voltage across the input terminals of the phase shifting network being equal to that of the alternating voltage supplied to the main electrode circuit.

The last-mentioned embodiment has the advantage that the control mechanism, that is to say the phase shifting network, may be connected to the same A.C. supply as the load, if desired through a series impedance.

When the load consists of inductively stabilized gas- and/or vapour discharge lamps, the arrangement is preferably constructed so that the primary of the transformer in the control circuit is shunted by a capacitor and this winding is connected in series with a resistor. The voltage supplied to this series-combination is the same as that supplied to the main electrode circuit and the capacitor and the resistor are proportioned so that the voltage induced in the secondary of the transformer lags by 20° to 40° with respect to the voltage supplied to the main electrode circuit.

With a view to the stabilization, in the case of inductively stabilized gas- and/or vapour discharge lamps, the lag angle is in practice approximately 60°. When use is made of the above-mentioned sinusoidal voltage in the control circuit, a control voltage can be available at any desired instant of becoming conductive and this control voltage may subsist for a given period of time. In a given case this control voltage does not subsist till 60° after the zero passage of the supply voltage but till 20° to 40° thereafter. In such a case, the control of rectifiers having a low holding current will be a little less satisfactory in the weakly dimmed position. However, this deterioration in quality of the illumination is hardly noticeable. This solution may be considered as a satisfactory compromise between the requirements to be imposed on the leading edge and on the trailing edge of the control signal. This solution in which a signal of medium length is used has the additional advantage that when given rectifiers are used which become comparatively hot if during the zero passage of the load current a signal subsists for a comparatively long period of time, the heat development does not exceed the permissible limits.

The invention will now be described more fully, by way of example, with reference to the accompanying drawing, in which:

FIG. 1 represents an electric circuit diagram of the arrangement according to the invention.

FIG. 2 shows details of the load portion of FIG. 1.

FIG. 3 shows a graph of the voltage- and current variation of one of the rectifiers.

In FIG. 1, reference numerals 1 and 2 denote the input terminals of the arrangement. They are to be connected to the alternating voltage supply of, for example, 220 v., 50 c./s. Current conductors 3 and 4 are connected to the terminals 1 and 2. The conductor 3 is connected through a lead 5 with two reversely connected controlled silicon rectifiers 6 and 7. The other ends of these rectifiers are connected through a connecting lead 8 with a load 9. The load 9 is connected through a lead 10 with the conductor 4. For a reason to be explained hereinafter, the load 9 is also connected through a lead 11 in series with the lead 5 to the conductor 3. The load 9 consists of low-pressure mercury vapour discharge lamps 12, 13 (see FIG. 2), each lamp being connected in series with choke coils 14 and 15, respectively. These series-combinations are connected between the leads 8 and 10. In a practical embodiment, each of the lamps absorbs approximately 40 w. In this embodiment, the choke coils have an inductance of approximately 1.3 henries. Under full load conditions, the lamp current lagged by approximately 60°. Filament current transformers for supplying the heating currents for the electrodes of the lamps 12 and 13 are denoted by 16 and 17, respectively. These transformers 16 and 17 are connected between the leads 11 and 10, which implies that their primaries are at the supply voltage.

The electrode 19 of the lamp 12 is connected to the secondary 18 of the filament current transformer 16. The electrode 21 of the lamp 13 is connected to the secondary 20 of the filament current transformer 17. The electrode 23 of the lamp 12 is connected to the winding portion 22 of the transformer 16. The electrode 25 of the lamp 13 is connected to the winding portion 24 of the transformer 17. Since invariably the full supply voltage is supplied to the transformers 16 and 17, independently of the position of dimming, a sufficient heating of the lamp electrodes may be guaranteed.

This part of the figure description was concerned with the main circuit of the diagram. Now the control circuit will be described.

The control circuit consists of the following main parts. Firstly a phase shifting network 26, the input terminals 27 and 28 of which are connected to the conductors 3 and 4, respectively. Secondly, a push-pull transistor amplifier 29. Provision is further made of a transformer 30 which is supplied from the supply lines. The arrangement further comprises two transformers 31 and 32 for coupling the transistor amplifier 29 with the connecting leads 33, 34, 35 and 36 which are connected with the rectifiers 6, 7 and with the leads 8, 5, respectively.

The phase shifting network 26 of the control circuit comprises an inductor 37 which is located between the input terminals 27 and 28. This network further comprises a resistor 38 and a transductor 39. These two elements are connected in series with the terminals 27 and 28. The induction of the transductor is varied with the aid of a controllable direct current. This current is supplied by a direct voltage source 40. The direct current reaches the transductor via a controllable resistor 41. This current flows through a lead 42 and a switch 43 back to the source 40. In order of succession, the following series-connected elements are provided between the center tap 44 of the inductor 37 and a point 45 on the connecting line between the resistor 38 and the transductor 39: Two diodes 46 and 47 connected in opposite senses and a resistor 48.

The connecting lead between the diodes 46 and 47 is connected with the emitters of two transistors 49 and 50. The connecting lead between the tapping 44 and the diode 46 is connected with the base of the transistor 49. The connecting lead between the diode 47 and the resistor 48 is connected with the base of the transistor 50. The collector of the transistor 49, which is associated with the transistor amplifier 29, is connected, through the series-combination of a current-limiting resistor 51 and a diode 52, with the primary 53 of the transformer 31. The other end of the primary 53 is connected with one of the secondaries 54 of the transformer 30 supplied from the supply lines. The other end of the winding 54 is connected with the emitters of the transistors 49 and 50. In a similar manner, the collector of the transistor 50 is connected, through the series-combination of a resistor 55, a diode 56 and the primary 57 of the transformer 32, to the secondary 58. The other end of the winding 58 is connected with the end of the winding 54 connected to the emitters.

The primary 59 of the transformer 30 is shunted by a capacitor 60 and is connected via a series resistor 61 to the supply conductors 4 and 3.

One end of the secondary winding 62 of the transformer 31 is connected through a lead 33 to the control electrode of the rectifier 6. The other end of the winding 62 is connected through the lead 34 to the cathode of the rectifier 6.

One end of the secondary winding 63 of the transformer 32 is connected through a lead 35 to the cathode of the rectifier 7. The other end of the winding 63 is connected through lead 36 to the control electrode of the rectifier 7.

FIG. 1 shows one arrangement. When several arrangements of this kind should co-operate, the switch 43 of the direct-current circuit of the transductor 39 may be switched so that 43 connects the lead 42 with the contact 64. The direct contact 42–65 (see FIG. 1) is then interrupted. The terminal 64 may then be connected with one or more direct-current windings of transductors of other corresponding arrangements. The current flows back through a lead 66.

The described arrangement operates as follows. In a given position of resistor 41 in the direct current circuit of the transductor 39, the phase of the voltage across 44, 45 is shifted by a given angle with respect to the phase of the supply voltage. When at a given instant the voltage at the tapping 44 is positive with respect to that at point 45, the diode 46 is conductive. However, a voltage then appears at the diode 47 which renders the emitter of the transistor 50 sufficiently positive with respect to its base to render the transistor 50 conductive.

The instant at which the transistor 49 becomes conductive is shifted in phase by 180° with respect to the instant at which transistor 50 becomes conductive.

In the present practical embodiment, the phase shift in the phase shifting network is chosen so that the voltage across the diodes 46 and 47 lags by at least 60° with respect to the supply voltage. The earliest instant at which the transistors 49 and 50 can become conductive consequently lies at the zero passage of the full-load current flowing through the main circuit. As has been stated hereinbefore, the latter current also lags by 60° with respect to the supply voltage.

When transistor 50 has become conductive, the circuit comprising emitter of transistor 50—collector of transistor 50, resistor 55, diode 56, winding 57, winding 58, emitter of transistor 50 is closed. The voltage induced by winding 59 in winding 58 now causes a current to flow in this closed circuit. Since the capacitor 60 and the resistor 61 respectively have the following values: 0.94 μf. and 2000Ω and the inductance of winding 59 is approximately 70 mh., the voltage induced in the winding 58 lags by approximately 30° with respect to the supply voltage. This means that the said circuit is closed at least approximately 30° after the zero passage of the voltage induced in the winding 58. Consequently, this also means that at the instant at which the transistor 50 becomes conductive an instantaneous voltage is available which consequently abruptly causes a great current to pass through the closed circuit. As a result, this current has a steep leading edge. This signal is converted through transformer 32 into a control voltage having a steep leading edge, which control voltage is supplied to the rectifier 7. This rectifier then becomes conductive. The control signal at 7 subsists until the instant of the zero passage of the voltage induced in the winding 58. For, the transistor 50 becomes non-conductive only at a later stage.

In the next half cycle, transistor 49 becomes conductive. The rectifier 6 is then rendered conductive through winding 54 and transformer 31.

FIG. 3 shows a graph of the voltage-current variation for a given dimming position.

In this FIG. 3, reference numeral 67 denotes the supply voltage as a function of time. The axis indicated by an arrow is the time axis. Reference numeral 68 denotes the load current which passes through the rectifiers 6 or 7 if these rectifiers would constantly be conductive in their forward direction. Consequently, this is the aforementioned full-load current. The load current 68 lags by, for example, 60° with respect to the voltage 67. Reference numeral 69 designates the sine wave of the control voltage. This voltage 69 lags by, for example, 30° with respect to the supply voltage and then leads by 30° with respect to the current 68. The instant at which the rectifier becomes conductive is designated by 70. In FIG. 3, the control signal is indicated by a shading. Reference numeral 71 represents the instantaneous current which appears at the instant of switching-on 70. If at the instant 70 a relatively narrow pulse-shaped control signal were used instead of the control signal illustrated, then, the rectifier would become non-conductive at the instant at which it attains its holding current value 72. However, a second rectifier having a holding current value 73 would not become non-conductive until the instant it reached the value 73, as a result of which the illumination of the sections would be non-uniform.

When the control signal subsists, the load currents pass through zero at the same instant, that is to say at 74.

What is claimed is:

1. A circuit for coupling a source of AC voltage of a given frequency to an electric load having inductance, said circuit comprising first and second controlled rectifiers each of which includes an anode, a cathode and a control electrode for controlling current flow in the path defined by said anode and cathode, means connecting said controlled rectifiers in inverse-parallel relationship in series with said voltage source and said load, amplifier means having first and second electrodes defining a current path therein and a control electrode for controlling the flow of current in said path, means providing a first AC voltage of said given frequency which lags the voltage of said AC voltage source, means for supplying said first AC voltage to said amplifier first and second electrodes, means providing a second AC voltage of said given frequency which lags said first AC voltage, means for supplying said second AC voltage to said amplifier control electrode thereby to control the initiation of current flow therein so as to produce in said amplifier means a control voltage of said given frequency having a sharply rising leading edge followed by a substantially sinusoidal waveform portion which passes through zero at a time which is at least later than the corresponding zero passage of said AC voltage supplied to the anode-cathode paths of the controlled rectifiers, means for coupling said control voltage to the control electrodes of said controlled rectifiers thereby to initiate current flow therein in alternate half-cycles of said AC voltage source, and means for adjusting the phase of said second AC voltage relative to said first AC voltage thereby to adjust the phase angle of said control voltage relative to said source of AC voltage to alter the firing angle of said controlled rectifiers.

2. A circuit as described in claim 1 wherein said phase adjusting means comprises an adjustable phase shift network having input means supplied with an AC voltage of said given frequency and output means for supplying said phase adjusted second AC voltage to said amplifier control electrode.

3. A circuit as described in claim 1 wherein said amplifier means comprises first and second transistors each having emitter, collector and base electrodes, corresponding to said amplifier means first electrode, second electrode and control electrode respectively, said first AC voltage supplying means comprising a transformer having a primary winding to which an AC voltage of said given frequency is applied and a secondary winding in which said lagging first AC voltage is induced, means connecting the emitter-collector path of one of said transistors in series circuit with said secondary winding thereby to derive in said series circuit said control voltage, and means for coupling said control voltage across the cathode and control electrode of at least one of said controlled rectifiers.

4. A circuit as described in claim 3 further comprising a variable phase shifting network having input terminals connected to an AC voltage of said given frequency which is in phase with the AC voltage supplied to the anode-cathode circuit of said controlled rectifiers, and means for coupling the phase shifted output voltage of said network to the control electrode of the transistor connected to said secondary winding thereby to periodically and adjustably initiate conduction in said transistor emitter-collector path.

5. A circuit as described in claim 3 wherein said load comprises one or more inductively stabilized gas or vapor discharge tubes, said circuit further comprising, a capacitor connected in parallel with the primary winding of said transformer, a resistor connected in series with said primary winding, and means connecting this series combination across said AC voltage source, said resistor and capacitor being chosen so that the voltage induced in said transformer secondary winding lags said AC source voltage by 20 to 40 electrical degrees.

6. A circuit for energizing an inductive load comprising, a source of AC voltage of a given frequency, first and second semiconductor controlled rectifiers each of which includes first and second electrodes defining a main electrode current path therein and a control electrode for controlling the flow of current in said path, means connecting said controlled rectifiers in inverse-parallel relationship, means connecting said rectifiers and load in series circuit across said AC voltage source, a variable phase shifting network coupled to said AC voltage source and having output terminals for providing a phase shiftable voltage of said given frequency which lags the voltage of said AC source, waveform generating means comprising first and second input means and output means, a phase shift circuit coupled to said AC voltage source and having output terminals coupled to said first input means for applying thereto a first AC voltage which lags the voltage of said AC voltage source, means coupling said second input means to the output terminals of said variable phase shifting network, and means coupling said output means to the control electrodes of said controlled rectifiers, said variable phase shifting network supplying a phase shiftable voltage which lags said first AC voltage throughout its range of adjustment whereby said waveform generating means produces at said output means a control voltage of said given frequency having a waveform which exhibits a substantially vertical leading edge and a substantially sinusoidal trailing edge which lags the AC voltage across the main electrode path of said controlled rectifiers.

7. A circuit as described in claim 6 wherein said waveform generating means comprises first and second transistors arranged in a push-pull circuit, said first input means comprising a transformer having a primary winding coupled to the output terminals of said phase shift circuit and a center tapped secondary winding connected in series circuit with the emitter-collector paths of said first and second transistors, said second input means including the base-emitter circuits of said transistors, and means connecting the center tap of said secondary winding and the emitter electrodes of said first and second transistors together in a common junction.

8. A circuit as described in claim 7 wherein the output means of said waveform generating means comprises second and third transformers each of which comprises a primary and a secondary winding, means connecting the primary winding of said second transformer in a closed loop circuit with said first transistor and one half of said first transformer secondary winding, means connecting the primary winding of said third transformer in a closed loop circuit with said second transistor and the other half of said first transformer secondary winding, and means connecting the secondary windings of said second and third transformers to the control electrodes of said first and second controlled rectifiers, respectively.

References Cited
UNITED STATES PATENTS

| | | | |
|---|---|---|---|
| 3,128,422 | 4/1964 | Brown | 315—194 |
| 3,142,781 | 7/1964 | Izenour | 315—194 |
| 3,204,113 | 8/1965 | Snygg | 315—196 |

JOHN W. HUCKERT, *Primary Examiner.*

J. D. CRAIG, *Assistant Examiner.*